United States Patent [19]

Suzuki

[11] Patent Number: 4,544,871
[45] Date of Patent: Oct. 1, 1985

[54] MEMORY RESET ARRANGEMENT FOR MIRROR

[75] Inventor: Masaru Suzuki, Chiryu, Japan

[73] Assignee: Kabushiki Kaisha Tokai Rika Denki Seisakusho, Japan

[21] Appl. No.: 509,164

[22] Filed: Jun. 28, 1983

[30] Foreign Application Priority Data

Jun. 28, 1982 [JP] Japan .................. 57-112136

[51] Int. Cl.⁴ ............................ G05B 19/42
[52] U.S. Cl. .................. 318/568; 74/501 M
[58] Field of Search ......... 318/568; 74/501 M; 350/289

[56] References Cited

U.S. PATENT DOCUMENTS

| | | | |
|---|---|---|---|
| 4,041,793 | 8/1977 | Repay | 74/501 M |
| 4,171,648 | 10/1979 | Manzoni | 74/501 M |
| 4,218,037 | 8/1980 | Palamountain | 74/501 M |
| 4,267,494 | 5/1981 | Matsuoka et al. | 318/568 |

FOREIGN PATENT DOCUMENTS 57-18192  4/1982  Japan .

*Primary Examiner*—B. Dobeck
*Attorney, Agent, or Firm*—Jackson & Jones

[57] ABSTRACT

An improved memory reset arrangement for a mirror such as a rearview mirror of a motor vehicle and the like, which is so arranged that push-pull driving shafts for tilting or pivoting the mirror are directly associated with memory switches for memorizing rotational positions of the mirror so as to simplify the construction of the memory reset arrangement for the mirror, with a consequent reduction in cost.

9 Claims, 6 Drawing Figures

MEMORY RESET ARRANGEMENT FOR MIRROR

BACKGROUND OF THE INVENTION

The present invention generally relates to an arrangement for operating a mirror, for example, a rearview mirror for a motor vehicle or the like, from the interior of the motor vehicle through remote control and more particularly, to a memory reset arrangement for a mirror which is adapted to return the mirror back to a predetermined specific standard position through one operation.

Conventionally, there has been proposed a memory reset arrangement for a rearview mirror of the above described type, for example, in Japanese Utility Model Laid-Open publication Jitsukosho No. 57-18192, entitled as "A reset apparatus for a remote controlled mirror".

The known reset apparatus as described above includes a housing for supporting a mirror, a driving shaft for tilting the mirror, movable contacts associated with said driving shaft, and a detector disposed to confront a range for sliding movement of the movable contacts, and said detector and said movable contacts are arranged to move the driving shaft so as to bring the mirror into a standard position, and also, to stop the movement of the driving shaft when the mirror has arrived at the standard position. The driving shaft is adapted to be releasably engaged with the detector, while said detector is also arranged to be releasably engaged with the housing at desired positions of said housing.

However, since the Japanese Utility Model Laid-Open publication Jitsukosho No. 57-18192 as described above discloses nothing about a mirror driving device, and is adapted to memorize the set position of the mirror by arranging four movable contacts and a stationary contact of a rectangular shape provided apart from the mirror driving device, to be detachably engaged with the mirror housing by a solenoid, there are such disadvantages that the number of parts involved therein is undesirably increased to complicate the construction, with a consequent high cost for the remote control mirror arrangement on the whole.

SUMMARY OF THE INVENTION

Accordingly, an essential object of the present invention is to provide an improved memory reset arrangement for a mirror, which is so arranged that push-pull driving shafts for tilting the mirror are associated, as they are, with memory switches for memorizing rotational positions of said mirror, thereby to simplify the construction of the memory reset arrangement for the mirror, with a consequent reduction in cost to a large extent.

Another object of the present invention is to provide a memory reset arrangement for a mirror of the above described type, which is stable and accurate in functioning at high reliability, and can be readily incorporated into various types of motor vehicles and the like.

In accomplishing these and other objects, according to one preferred embodiment of the present invention, it is so arranged that in a remote control type of angle adjusting arrangement for a mirror of a motor vehicle and the like, including a mechanism casing which is fixedly provided in a mirror housing and to which generally a central portion of a rear face of a back cover member or mirror cover for supporting the mirror is pivotally connected, and first and second push-pull driving shafts coupled to reversible motor means through power transmitting means and extending from said mechanism casing for axial movement so as to pivot or tilt said back cover member and mirror in predetermined directions about said pivotal connection, with one end of said first push-pull driving shaft being connected selectively to an upper or lower side, and with one end of said second push-pull driving shaft being connected selectively to a left or right side of said back cover member with respect to said central pivotal connection, there is provided a memory reset arrangement for the mirror. The memory reset comprises memory switches each including a switch shaft connected to the other end of each of said first and second push-pull driving shafts so as to be movable in an axial direction, a contact holder respectively fitted over the switch shaft in an axial direction for selective engagement with or disengagement from said switch shaft, and having movable contacts accommodated therein for selective projection or retraction with respect to said contact holder, and a fixed contact plate having a fixed contact formed face to which the movable contacts are held in sliding contact, with the contact holder being normally urged by a spring means to a predetermined neutral position on said fixed contact plate, an electro-magnetic clutch means for selective engagement or disengagement between said contact holder and said switch shaft, and a reset circuit for feeding electric power to said reversible motor means by effecting a self-retaining function in association with operation of a reset switch. The reset circuit is arranged to be released from said self-retaining function when the contact holder of the memory switch has arrived at the neutral position on the fixed contact plate.

By the arrangement according to the present invention as described above, an improved memory reset arrangement for a mirror efficient in operation and stable in functioning has been advantageously present through simple construction.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
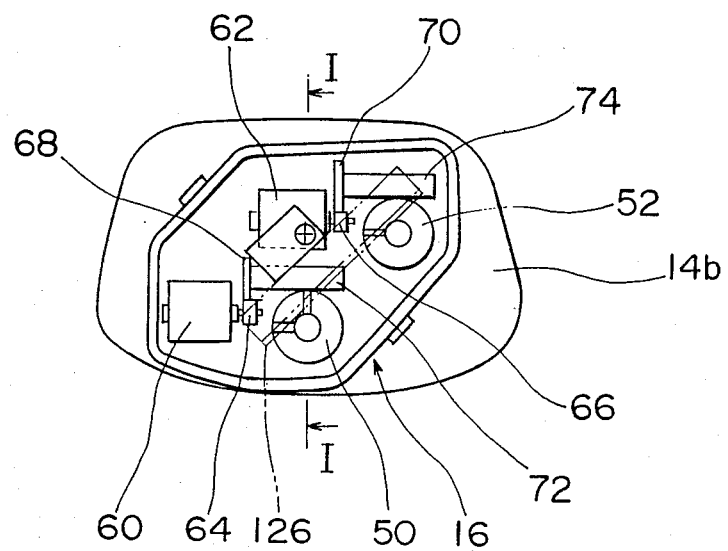
FIG. 1 is a schematic rear side view showing the state where a memory reset arrangement according to the present invention is mounted on a rear side face of a mirror, with an upper case of a mirror casing being removed for clarity.

Before the description of the present invention proceeds, it is to be noted that like parts are designated by like reference numerals throughout the accompanying drawings.

Figure 2:
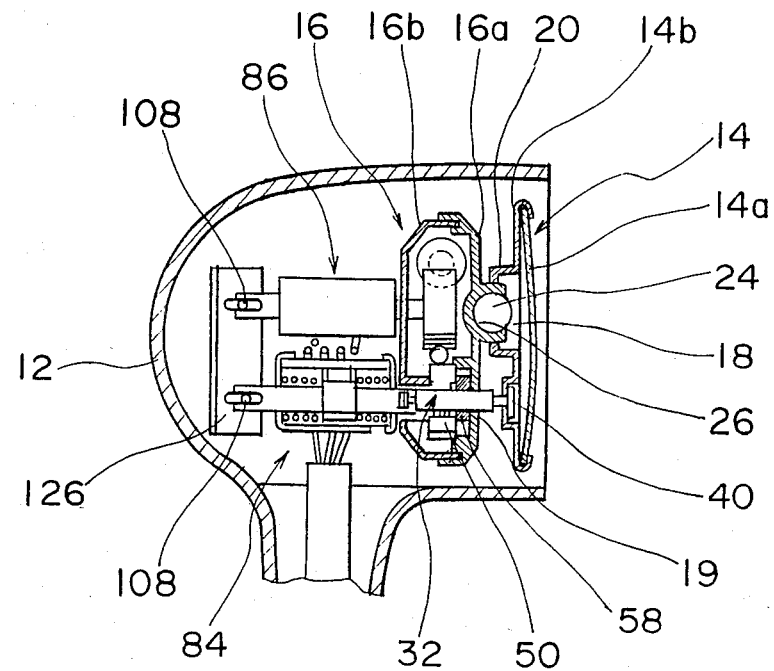
FIG. 2 is a cross section taken along the line I—I in FIG. 1.
Figure 3:
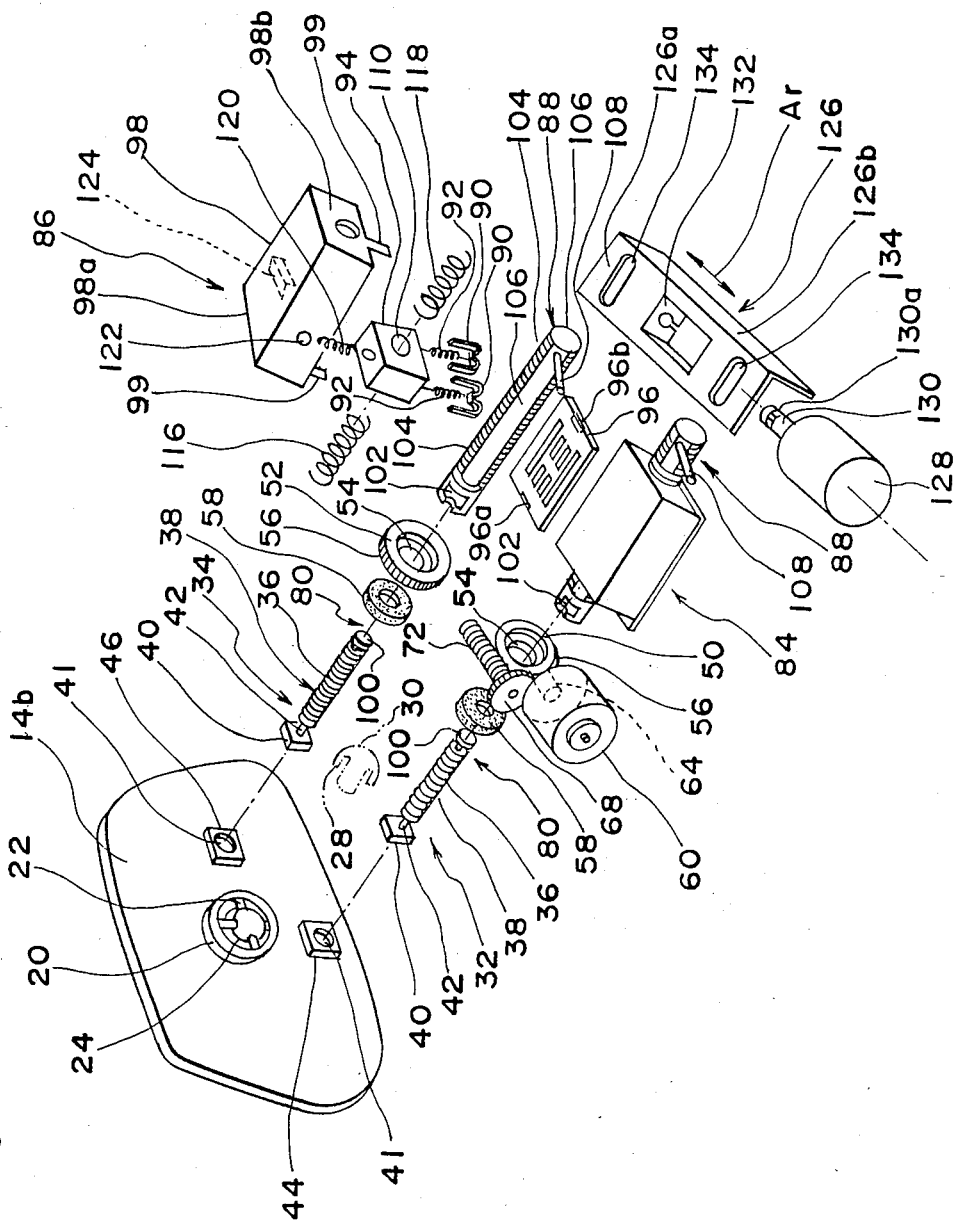
FIG. 3 is an exploded perspective view showing part of the arrangement in FIG. 1.

Referring now to the drawings, there is shown in FIGS. 1 to 3, a mechanism portion of a memory reset arrangement for a mirror, according to one preferred embodiment of the present invention.

The mechanism portion referred to above is accommodated in a casing 16 fixedly provided at the back of a mirror assembly 14 within a mirror housing 12, and including a lower casing 16a and an upper casing 16b applied onto the lower casing 16a, while the bottom portion of the lower casing 16a is connected, generally at its central portion, to a corresponding central portion of the mirror assembly 14 through a ball and socket joint so that the mirror assembly 14 may be pivoted or tilted as desired with respect to the casing 16. More specifically, the mirror assembly 14 includes a back cover member or a mirror cover 14b which supports a mirror 14a at its front portion, and which is provided with an opening 18 formed at its central portion, a cylindrical portion 20 extending rearwardly towards the lower casing 16a from the peripheral edge of said opening 18, and a ball member 24 supported by four pins 22 (FIG. 3) within the cylindrical portion 20.

On the other hand, at generally the central portion of the lower casing 16a, there is provided a bearing portion 30 (FIG. 3) having a spherical inner face 26 for receiving the ball member 24 therein and slits or notches 28 in which pins 22 of the mirror cover 14b are fitted. Thus, the ball member 24 and the pins 22 at the side of the mirror assembly 14 are respectively fitted into the spherical inner face 26 and slits 28 of the bearing portion 30 at the side of the casing 16, whereby the mirror 14a may be inclined or tilted in an upward or downward direction and also in lateral directions with respect to the casing 16 as desired.

As shown in FIG. 3, mirror push-pull driving shafts 32 and 34 of the same shape formed by a resilient material, for example, urethane rubber, natural rubber, silicone rubber, etc. are each connected, at one end thereof, to the mirror cover 14b at a lower portion and a right side portion with respect to the ball member 24, while the other ends of the mirror push-pull driving shafts 32 and 34 are introduced into the casing 16 through corresponding openings 19 formed in the bottom portion of the lower casing 16a in a manner as described hereinbelow.

More specifically, each of the mirror push-pull driving shafts 32 and 34 is provided with a rod-like portion 38 having an externally threaded portion 36 at its free end side, a rectangular stopper portion 40 formed at its end to be connected with the mirror cover 14b, and a flexible neck portion 42 of a reduced diameter formed between said stopper portion 40 and said rod-like portion 38, while in positions below and at the right side of the ball member 24 of the mirror cover 14b, rectangular or square raised portions 44 and 46 having openings 41 are respectively provided.

By the above arrangement, before the mirror 14a is fixed to the mirror cover 14b, the respective mirror push-pull driving shafts 32 and 34 are inserted into the corresponding openings 41 of the rectangular raised portions 44 and 46 from the front side of the mirror cover 14b, so that the rod-like portions 38 and the flexible neck portions 42 of the driving shafts 32 and 34 extend outwardly from the reverse surface of the mirror cover 14b, with the stopper portions 40 of said driving shafts 32 and 34 being forced into inner recesses of the rectangular raised portions 44 and 46 so as to be secured thereat.

Around the outer peripheral portions of the rod-like portions 38 of the mirror push-pull driving shafts 32 and 34 introduced into the casing 16, rotary cylinders 50 and 52 are respectively fitted. The rotary cylinders 50 and 52 are made of a synthetic resin higher in hardness than the material for the driving shafts 32 and 34 and they have internally threaded portions 54 which respectively engage the externally threaded portions 36 of the rod-like portions of the mirror push-pull driving shafts 32 and 34. Gears 56 are formed on the outer peripheries of the rotary cylinders 50 and 52 which are rotatably supported between seal washers 58 provided at the side of the lower case 16a, and the upper case 16b so as not to be movable in the axial direction.

The rotary cylinders 50 and 52 are each arranged to be driven for rotation by the driving mechanism of the same construction respectively accommodated in the casing 16. More specifically, the respective driving mechanisms referred to above include reversible motors 60 and 62, gears 64 and 66 fixedly mounted on the output shafts of said reversible motors 60 and 62, gears 68 and 70 in mesh with said gears 64 and 66, and worms 72 and 74 coaxially mounted with the gears 68 and 70 and engaging the gears 56 provided on the outer peripheries of the respective rotary cylinders 50 and 52. (FIGS. 1 and 3).

The driving mechanism as described above are so arranged that, upon driving of either one of the reversible motors 60 or 62, the rotary cylinder 50 or 52 is rotated through the series of transmission members 64, 68 and 72 or 66, 70 and 74, and thus, the mirror push-pull driving shaft 32 or 34 is axially displaced through engagement of the externally threaded portion 36 of the rod-like portion 38 with the internally threaded portion 54 of the rotary cylinder 50 or 52 so as to tilt the mirror assembly 14 about the ball member 24 in the upward and downward directions or in the lateral directions.

According to the present invention, in the angle adjusting arrangement for the mirror having the construction as described above, the free ends or rear ends 80 of the respective mirror push-pull driving shafts 32 and 34 are extended through the upper case 16b of the casing 16 for the mechanism portion, into the mirror housing 12, and are rotatably connected to switch shafts 88 of memory switches 84 and 86 to be described later.

The memory switches 84 and 86 have the same construction, and as shown in FIG. 3 with reference to the memory switch 86, each includes a contact holder 94 fitted onto the switch shaft 88 and having movable contacts 90 displaceably supported therein through springs 92 for selective protrusion out of or retraction into said contact holder 94, a stationary contact plate 96 which is held in sliding contact with said movable contacts 90, and an outer casing 98 applied thereonto as shown.

Each of the switch shafts 88 as described above is provided, at its one end, with a coupling portion 102 which is fitted over a corresponding disc-like coupling portion 100 formed at the free end 80 of each of the mirror push-pull driving shafts 32 and 34 so that said driving shafts 32 and 34 are rotatably connected to the switch shafts 88.

Moreover, each of said switch shafts 88 is provided, on its peripheral surface in the axial direction, with protrusions 104 in the form, for example, of a male thread of a predetermined pitch, except for the coupling portion 102 thereof, and also, with a pair of parallel flat faces 106 axially formed by cutting the peripheral surface at confronting positions to a depth larger than a depth at the bottom of said protrusions 104.

Furthermore, at the other end of each of said switch shafts 88, there is provided a rotational driving pin 108 extending outwardly approximately at right angles from the flat face 106 for rotating the switch shaft 88.

Meanwhile, the contact holder 94 to be fitted over the switch shaft 88 is formed with a fitting bore 110 having a configuration generally similar to the cross sectional shape of the switch shaft 88.

Figure 4:
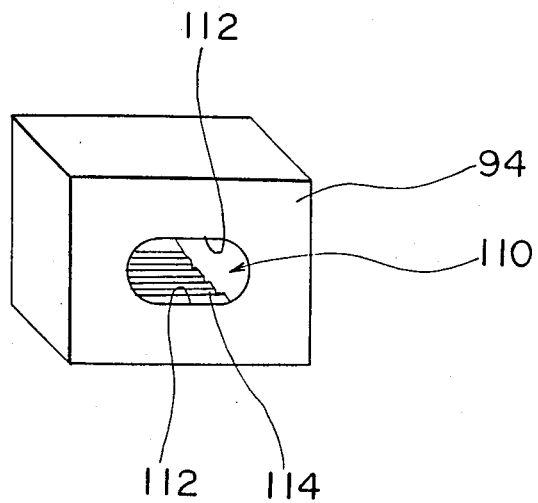
FIG. 4 is a perspective view explanatory of an engaging and disengaging mechanism of a contact holder for a memory switch employed in the arrangement of FIGS. 1 and 2.

As is most clearly seen in FIG. 4, the fitting bore 110 as referred to above is provided with a pair of parallel flat faces 112 having an interval slightly larger than the interval between the pair of parallel flat faces 106 of the switch shaft 88, while said flat faces 112 are formed with grooves 114 in the form, for example, of a female thread or the like for engagement with the protrusions 104 of the switch shaft 88. The semi-circular portions at opposite sides of said fitting bore 110 are each formed to be somewhat larger in diameter than the diameter at the outer peripheral portion of said switch shaft 88.

Accordingly, when the flat faces 106 of the switch shaft 88 are directed in parallel with the flat faces 112 of the fitting bore 110 of the contact holder 94, said contact holder 94 is movable in the axial direction of the switch shaft 88, since the protrusions 104 of the switch shaft 88 are out of engagement with the grooves 114 in the flat faces 112 of the fitting bore 110, while on the contrary, upon rotation of the switch shaft 88 through approximately 90° from the above state, the protrusions 104 of the switch shaft 88 are brought into engagement with said grooves 114, so that the contact holder 94 becomes immovable in the axial direction of said switch shaft 88.

More specifically, the switch shaft 88 axially extends through the outer casing 98 of the memory switch 86 from one side face 98a towards the confronting other side face 98b so as to be movable in the axial direction and also rotatable with respect to said outer casing 98, while coil springs 116 and 118 are respectively provided between said one side wall 98a of the outer casing 98 and the contact holder 94, and also between the other side wall 98b of said outer casing 98 and the contact holder 94, and in the above state, claws 99 provided on said side walls 98a and 98b of the outer casing 98 are fitted into the notches 96a and 96b formed in the corresponding edges of the stationary contact plate 96 so as to be folded thereat for fixing said contact plate 96 to the outer casing 98.

In the state where the stationary contact plate 96 is secured to the outer casing 98 as described above, the movable contacts 90 supported by the contact holder 94 are held in pressure contact with stationary contacts to be mentioned later formed on the contact plate 96 by the spring force of the springs 92 described earlier.

Although the contact holder 94 is stopped at a neutral position N (FIG. 5) where the spring force of the coil spring 116 is balanced with that of the coil spring 118 upon disengagement between the protrusions 104 of the switch shaft 88 and the grooves 114 formed in the fitting bore 110 of said contact holder 94, it is preferable to provide a detent mechanism constituted, for example, by a ball 122 disposed in the contact holder 94 for free projection or retraction with respect thereto through a spring 120, and a fitting groove 124 and the like formed in the outer casing 98 for engagement with said ball 122 so that the contact holder 94 may positively stop at said neutral position N.

The switch shafts 88 of the respective memory switches 84 and 86 are rotated through about 90° by a solenoid 128 via the rotational driving pins 108 and a crank plate 126 to be described below, which constitute an electromagnetic clutch means.

The crank plate 126 includes a rectangular main plate portion 126a and a reinforcing portion 126b folded approximately at right angles with respect to the main plate portion 126a, and said main plate portion 126a is provided with a solenoid engaging portion 132 in which a neck portion 130a formed at a forward end of a solenoid shaft 130 of the solenoid 128 is fitted, and also, provided with elongated openings 134 for engagement with the rotational driving pins 108 of the switch shafts 88 for the memory switches 84 and 86.

Each of the above elongated openings 134 is arranged to have a length slightly larger than the maximum amount of axial displacement of the switch shafts 88 of the memory switches 84 and 86 so as to allow said switch shafts 88 to be displaced in the axial direction, while, through movement of the crank plate 126 in the directions indicated by arrows $A_r$ by the solenoid 128, the switch shafts 88 are rotated by the engagement of the driving pins 108 thereof with the elongated openings 134 of the crank plate 126 for engagement and disengagement between the switch shafts 88 and the contact holder 94.

Figure 5:
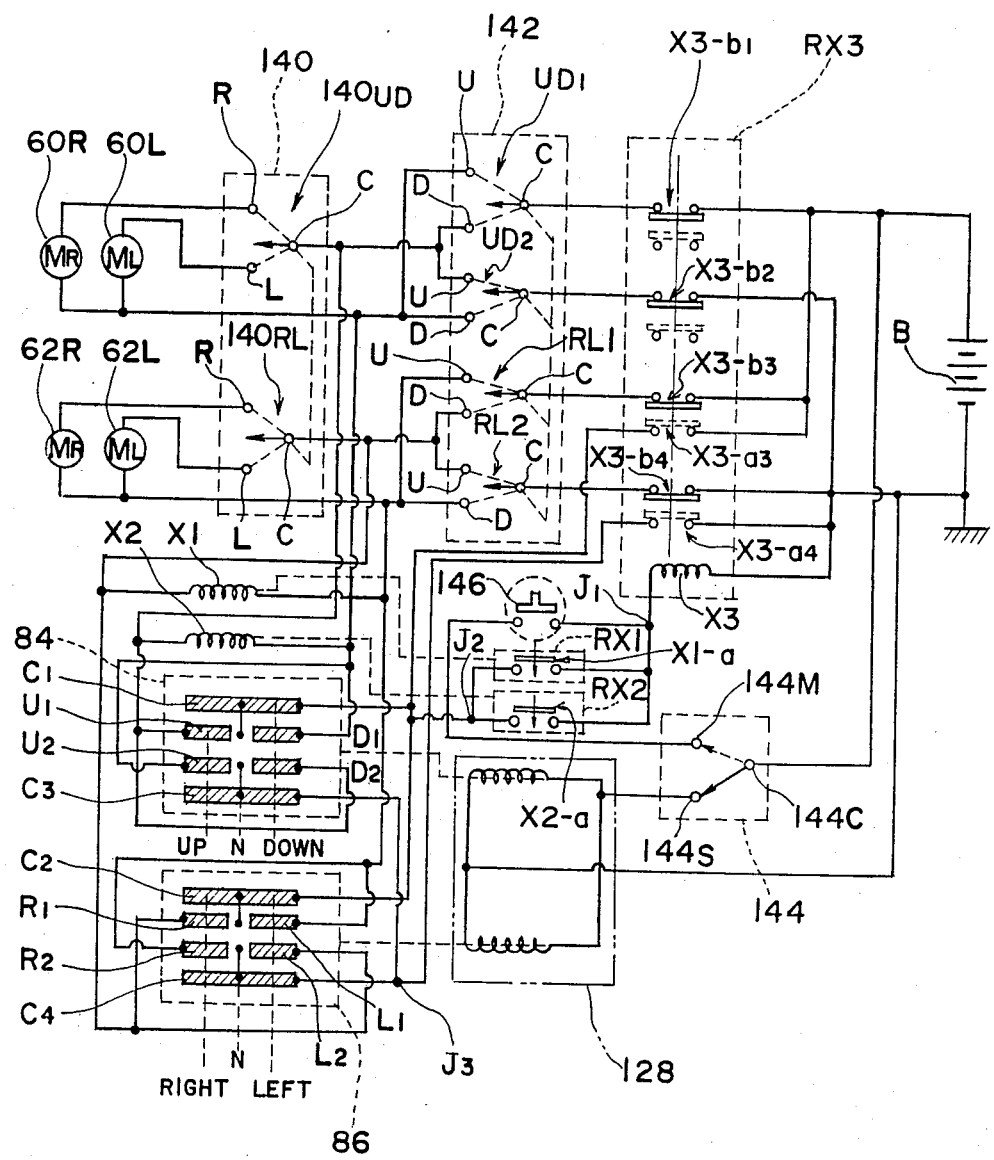
FIG. 5 is an electrical circuit diagram showing a control circuitry for the memory reset arrangement according to the present invention.

Reference is also made to FIG. 5 showing a control circuit of the memory reset arrangement for a mirror having the mechanism portion as described so far.

In FIG. 5, the control circuit generally includes a left and right mirror change-over switch section 140 for selecting the mirror to be subjected to angle adjustment, a direction control switch section 142 for selecting the direction for tilting of the mirror assembly 14, a set switch 144 for changing over between a set mode for setting the angle for the mirror assembly 14 and a memory mode for memorizing the set angle for the mirror assembly 14, a reset switch 146 for returning the mirror assembly 14 back to a position at a preliminarily set angle, and relays RX1, RX2 and RX3 which constitute a reset circuit for returning the mirror assembly 14 to the position at the set angle, together with the memory switches 84 and 86 and the reset switch 146 mentioned above.

The left and right mirror change-over switch 140 includes two double pole double throw switches 140UD and 140RL each having a neutral position, and the fixed contacts R and L of the one switch 140UD are respectively connected to the corresponding ends of the reversible motors 60R and 60L for upwardly and downwardly tilting the mirror assembly 14, for example, rearview mirrors at the left side and right side of the motor vehicle, while the fixed contacts R and L of the other switch 140RL are respectively connected to corresponding ends of the reversible motors 62R and 62L for laterally tilting the mirror assembly 14, for example, rearview mirrors at the left side and right side of the motor vehicle.

On the other hand, the direction control switch 142 includes two sets of double pole double throw switches UD1 and UD2, and RL1 and RL2. The fixed contact U of the switch UD1 and the fixed contact D of the switch UD2 are connected to each other so as to be connected to the respective other ends of the reversible motors 60R and 60L, while the fixed contact D of the switch UD1 and the fixed contact U of the switch UD2 are also connected to each other so as to be connected to the movable contact C of the switch 140UD of the left and right mirror change-over switch 140.

Moreover, the fixed contact U of the switch RL1 and the fixed contact D of the switch RL2 of the direction control switch 142 are connected to each other so as to be connected to the respective other ends of the reversible motors 62R and 62L, while the fixed contact D of the switch RL2 and the fixed contact U of the switch RL2 are connected to each other so as to be connected to the movable contact C of the switch 140RL of the left and right mirror change-over switch 140.

The movable contact C of the switch UD1 and the movable contact C of the switch RL1 for the direction control switch 142 are connected to the positive electrode of a power source or battery B through normally closed contacts X3-b1 and X3-b3 of the relay RX3, while the movable contact C of the switch UD2 and the movable contact C of the switch RL2 for the direction control switch 142 are connected to a negative electrode of the battery B through the normally closed contacts X3-b2 and X3-b4 of the relay RX3 respectively.

One end of a driving coil X3 of said relay RX3 is connected to the negative electrode of the battery B, while the other end of the above driving coil X3 is connected to a fixed contact 144M at the memory side of the set switch 144 through the reset switch 146.

The solenoid 128 is connected between the set side fixed contact 144S of the set switch 144 and the negative electrode of the battery B, and the movable contact 144 C of the set switch 144 is connected to the positive electrode of the battery B.

To a junction J, between the reset switch 146 and the driving coil X3 of the relay RX3, one end of each of the normally open contact X1-a of the relay RX1 and the normally open contact X2-a of the relay RX2 is connected, while the normally open contacts X1-a and X2-a are connected to each other, and a junction J2 therebetween is connected to the positive electrode of the battery B through the normally open contact X3-a3 of the relay RX3.

The junction J2 as described above is farther connected to a common contact C1 formed on the fixed contact plate 96 of the memory switch 84 and a common contact C2 formed on the fixed contact plate 96 of the memory switch 86.

The fixed contact plate 96 of the memory switch 84 has another common contact C3, and fixed contacts U1 and U2 and D1 and D2 which are connected to the above common contacts C1 and C3 by the movable contacts 90 in FIG. 3.

Meanwhile, the fixed contact plate 96 of the other memory switch 86 has another common contact C4, and also fixed contacts R1 and R2, and L1 and L2 which are connected to the above common contacts C2 and C4 by the movable contacts 90 shown in FIG. 3.

In the memory switches 84 and 86, the above movable contacts 90 do not contact the fixed contacts U1 and U2, D1 and D2, and R1 and R2, and L1 and L2, when the contact holder 94 has already been located at the neutral position N.

The fixed contacts D1 and U2 of the above memory switch 84 are connected to one end of the driving coil X2 of the relay RX2, and the fixed contacts U1 and D2 thereof are connected to the other end of said driving coil X2, while said one end and the other end of the driving coil X2 of the relay RX2 are respectively connected to the corresponding other ends of the reversible motors 60R and 60L and also, to the movable contact C of the switch 140UD for the left and right mirror change-over switch 140.

Similarly, with respect to the other memory switch 86 also, the fixed contacts L1 and R2 are connected to one end of the relay driving coil X1 of the relay RX1, and the fixed contacts R1 and L2 are connected to the other end of said driving coil X1, while said one end and the other end of the driving coil X1 are respectively connected to the corresponding other ends of the reversible motors 62R and 62L and also to the movable contact C of the switch 140RL of the left and right mirror change-over switch 140.

Figure 6:
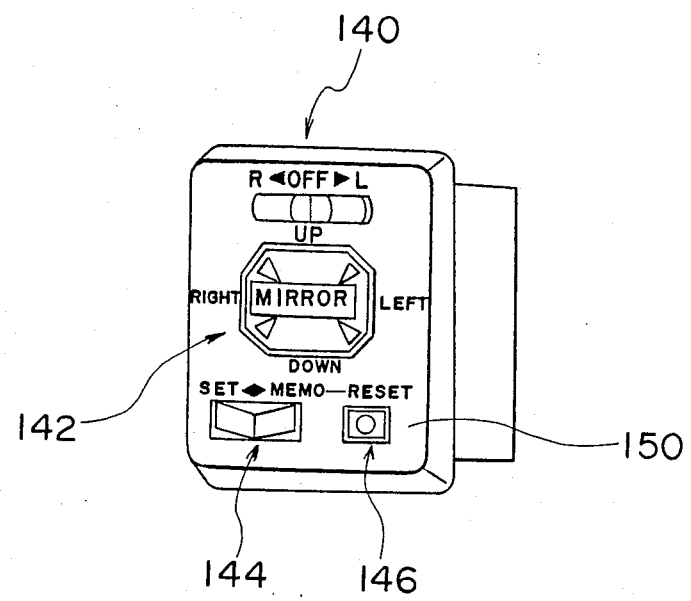
FIG. 6 is a perspective view showing an appearance of a control switch for the memory reset arrangement according to the present invention.

It should be noted here that, in the above control circuit, the left and right mirror change-over switch 140, direction control switch 142, set switch 144 and reset switch 146 are constituted as a composite switch whose control portions are disposed in one panel 150 as shown in FIG. 6.

Subsequently, functionings of the memory reset arrangement for a mirror having the construction as described so far will be explained hereinbelow.

When the movable contact 144C of the set switch 144 is connected to the fixed contact 144S at the set side, the solenoid 128 is energized, and the crank plate 126 is displaced to the side of said solenoid 128.

The displacement of the crank plate 126 as described above is transmitted, through the rotational driving pins 108, to the switch shafts 88 of the memory switches 84 and 86. When the switch shafts 88 are rotated through approximately 90° and the flat faces 106 of said switch shafts 88 confront the flat faces 112 of the fitting bore 110, the contact holder 94 is released from engagement with the switch shafts 88 so as to be urged into the neutral position N by the coil springs 116 and 118, and the movable contacts 90 of the memory switch 84 do not contact any of the fixed contacts U1, U2 and, D1 and D2, while the movable contacts 90 of the memory switch 86 contact neither of the fixed contacts R1, R2, L1 or L2.

On the other hand, in the above state, since the relay RX3 is not energized, with the normally closed contacts X3-b1, X3-b2, X3-b3 and X3-b4 thereof turned on, it is possible to adjust angles of the mirrors, for example, rearview mirrors at the left side and right side of the motor vehicle, to a standard position suitable for a driver by the direction control switch 142 through selection of the reversible motors 60R and 60L or 62R and 62L by means of the left and right mirror change-over switch 140.

Subsequently, upon changing-over of the movable contact 144C of the set switch 144 to the fixed contact 144M at the memory side in the above state, the solenoid 128 is de-energized, with the crank plate 126 being displaced by a spring means (not shown), in a direction opposite to that when said crank plate 126 is directed against the solenoid 128, and the switch shafts 88 of the memory switch 84 and 86 rotate in a direction opposite to that during setting so as to fit the protrusions 104 of the switch shafts 88 into the grooves 114 of the fitting bore 110 for the contact holder 94, and thus, said contact holder 94 is stopped by the switching shafts 88.

Thereafter, when the driver tilts the mirror assembly 14 upwardly or downwardly or leftward or rightward from the standard position as described earlier through operation of the direction control switch 142 so as to observe, for example, a ditch or the like on the road, the switch shafts 88 of the memory switches 84 and 86 are axially displaced, whereby the contact holder 94 is also displaced from the neutral position N.

Now, it is assumed that, by the displacement of the contact holder 94 as described above, the movable contacts 90 of the memory switch 84 bring into contact, for example, the fixed contact D1 with the common contact C1, and the fixed contact D2 with common contacts C2 and C3 respectively, while the movable contacts 90 of the other memory switch 86 bring into contact, for example, the fixed contact R1 with the common contact C2, and the fixed contact R2 with the common contact C4 respectively.

In the above state, when the driver turns on the reset switch 146 so as to return the mirror assembly 14 back to the standard position initially set for restoring the original state of driving, the relay RX3 is energized to open or turn off its normally closed contacts X3-b1 to X3-b4, and to close or turn on its normally open contacts X3-a3 and X3-a4.

When the normally open contacts X3-a3 and X3-a4 are closed as described above, the relay RX2 is energized to close its normally open contact X2-a, since the common contact C1 of the memory switch 84 is connected with the fixed contact D1, and the common contact C3 thereof with the fixed contact D2, while due to the fact that the common contact C2 of the memory switch 86 is connected with the fixed contact R1, and the common contact C4 thereof is connected with the fixed contact R2, the relay RX1 is energized to close its normally open contact X1-a, with the relay RX3 being thus self-retained.

In the above state, since battery voltage in a direction determined by the direction of deviation from the standard position of the mirror assembly 14 is being respectively applied across the driving coil X1 of the relay RX1 and also across the driving coil X2 of the relay RX2, the mirror assembly 14 is tilted towards the originally set standard position, if the mirror at the left side or right side is selected by the left and right mirror change-over switch 140.

In this case, the contact holders 94 of the memory switches 84 and 86 are displaced towards the neutral position together with the switch shafts 88, following inclination of the mirror assembly 14.

When the contact holders 94 reach the neutral position, the relays RX1 and RX2 are de-energized with the normally open contacts X1-a and X2-a thereof opened or turned off, with the relay RX3 being released from the self-retaining, while power supply to the reversible motor 60R, 60L, 62R or 62L is suspended, and the mirror assembly 14 is stopped in the state where it is again set at the standard position initially set.

Even when the angle of the mirror assembly 14 is altered under the state where the set switch 144 has been changed over to the memory side, after setting the mirror assembly 14 to the standard position, the mirror assembly 14 may be reset to the original position again through one operation, if the reset switch 146 is turned on.

It should be noted here that the present invention is not limited in its application to the embodiment as described so far, but may be modified in various ways within the scope, if necessary. For example, the switch shafts 88 of the memory switches 84 and 86 described as prepared by the rods of circular cross-section having flat portions 106 and provided with the protrusions 104, may be replaced by rods of rectangular or square cross-section provided with protrusions at corner portions thereof, although not particularly shown.

Moreover, the arrangement for engagement and disengagement between the switch shafts and contact holders may be modified to be effected, for example, in such a manner that connecting members are inserted or withdrawn for engagement or disengagement between the switch shafts and the contact holders, by an electromagnetic clutch and the like, instead of rotating the switch shafts as in the foregoing embodiment.

As is clear from the foregoing description, according to the present invention, since it is so arranged that the axial displacement of the mirror push-pull driving shafts for pivoting or tilting the mirror assembly of a motor vehicle is memorized in the memory switch so that the reset circuit which feeds power to the motor for driving the mirror assembly is released from self-retaining when the contact holders of the memory switches have arrived at the neutral position, it is possible to return the mirror assembly to the predetermined original position through a simple mechanism by merely associating the memory switches with the mirror push-pull driving shafts, while owing to the reset mechanism of a simple construction, the cost required for the memory reset arrangement can be markedly reduced.

It is to be noted here that, in the foregoing embodiment, although the present invention has been mainly described with reference to the memory reset arrangement for mirrors to be used in a motor vehicle and the like, the concept of the present invention is not limited in its application to such memory reset arrangement for mirrors alone, but may readily be applied to memory reset arrangements for angle adjustments in general, for example, adjustments of antenna directions in radio transmission or reception, etc.

Although the present invention has been fully described by way of example with reference to the accompanying drawings, it is to be note here that various changes and modifications will be apparent to those skilled in the art. Therefore, unless otherwise such changes and modifications depart from the scope of the present invention, they should be construed as included therein.

What is claimed is:

1. In a remote control type angle adjusting arrangement for a mirror including a mechanism casing which is fixedly provided in a mirror housing and to which generally a central portion of a rear face of a back cover member for supporting the mirror is pivotally connected, and first and second push-pull driving shafts coupled to reversible motor means through power transmitting means and extending from said mechanism casing for axial movement so as to pivot said back cover member and mirror in predetermined directions about said pivotal connection, one end of said first push-pull driving shaft being connected selectively to an upper or lower side and one end of said second push-pull driving shaft being connected selectively to a left or right side of said back cover member with respect to said central pivotal connection, a memory reset arrangement for the mirror, which comprises memory switches each including a switch shaft connected to the other end of each of said first and second push-pull driving shafts so as to be movable in an axial direction, a contact holder fitted over the switch shaft in an axial direction for selective engagement with or disengagement from said switch shaft, and having movable contacts accommodated therein, and a fixed contact plate having a fixed contact formed face to which said movable contacts are held in sliding contact, said contact holder being normally urged by a spring means to a predetermined neutral position on said fixed contact plate, and an electro-magnetic clutch means for selective engagement or disengagement between said contact holder and said switch shaft, and a reset circuit for feeding electric power to said reversible motor means by effecting a self-retaining function in association with operation of a reset switch, said reset circuit being arranged to be released from said self-retaining function when said contact holder of said memory switch has arrived at said neutral position on said fixed contact plate.

2. A memory reset arrangement as claimed in claim 1, wherein said mechanism casing includes a lower casing and an upper casing which are combined with each other into one unit for accommodating therein said reversible motor means and power transmitting means through which said first and second push-pull driving shafts are coupled to said reversible motor means, said back cover member being pivotally connected to said lower casing through a ball and socket joint.

3. A memory reset arrangement as claimed in claim 1, wherein said power transmitting means includes gear trains respectively connected to output shafts of reversible motors for the reversible motor means, and threadedly coupled to said first and second push-pull driving shafts for selective advancing and retraction of said first and second push-pull driving shafts.

4. A memory reset arrangement as claimed in claim 1, wherein said first and second push-pull driving shafts are each coupled, at said one end thereof, to corresponding bearing portions provided on the rear face of said back cover member.

5. A memory reset arrangement as claimed in claim 1, wherein the other ends of said first and second push-pull driving shafts extending through said mechanism casing are rotatably coupled with corresponding ends of said switch shafts of said memory switches through engagement between disc-like coupling portions formed on said other ends of said first and second push-pull driving shafts and coupling portions formed on the corresponding ends of the switch shafts.

6. A memory reset arrangement as claimed in claim 5, wherein each of said switch shafts is provided with male thread-like protrusions formed on the peripheral surface thereof except for said coupling portion, and also with a pair of parallel flat faces axially formed by cutting the peripheral surface thereof at confronting portions to a depth larger than a depth at the bottom of said male thread-like protrusions, said contact holder 94 being formed with a fitting bore of a configuration generally similar to the cross section of said switch shaft, said fitting bore having a pair of parallel flat faces spaced at an interval slightly larger than an interval between the pair of parallel flat faces of said switch shaft, and also female thread-like grooves for engagement with said protrusions of the switch shaft, with semi-circular portions at opposite sides of said fitting bore being each formed to have a diameter slightly larger than the external diameter of said switch shaft, whereby when said flat faces of said switch shaft are directed in parallel with the flat faces of said fitting bore of the contact holder, said contact holder is movable in the axial direction of the switch shaft through disengagement between the protrusions and said grooves, and upon rotation of the switch shaft through approximately 90° therefrom, said contact holder becomes immovable in the axial direction of said switch shaft through engagement between said protrusions and said grooves.

7. A memory reset arrangement as claimed in claim 6, wherein said electro-magnetic clutch means includes a solenoid member coupled to a rotational driving pin provided on each of said switch shafts through a crank plate for the selective engagement and disengagement between said contact holder and said switch shaft.

8. A memory reset arrangement as claimed in claim 1, wherein said memory switch is provided with a detent mechanism for holding the contact holder at the neutral position when said contact holder has arrived at said neutral position.

9. A remote control rear view mirror apparatus for adjusting the angular position of a mirror of the type used on automobiles comprising:
 a mirror member;
 a mirror housing;
 a support member secured to the mirror housing and pivotally supporting the mirror in the mirror housing;
 first and second shafts offset from each other and coupled to the mirror member for linear movement so as to pivot the mirror member about a pivotal connection;
 means for selectively driving one or more of the shafts, one end of one shaft being connected to an upper or lower side of the mirror member on one side of the pivotal connection and an end of the other shaft being connected to a left or right side of the mirror member with respect to the pivotal connection whereby the mirror member can be automatically adjusted vertically and horizontally, and
 means for providing a set predetermined position of the mirror member and storing that position for an automatic return from other positions of the mirror member including a memory reset apparatus having a plurality of memory switches, each having a switch shaft connected to each of the shafts so as to be movable in an axial direction, a contact holder fitted over the switch shaft for selective engagement with or disengagement from the switch shaft and having movable contacts accomodated therein, a contact plate having a contact face to which the movable contacts are held in sliding contact, resilient means for urging the contact holder to a predetermined neutral position and means for engaging the contact holder and the switch shafts.

* * * * *